No. 666,745. Patented Jan. 29, 1901.
W. M. FABER & R. C. GREER.
WATER FILTER.
(Application filed May 18, 1900.)
(No Model.)
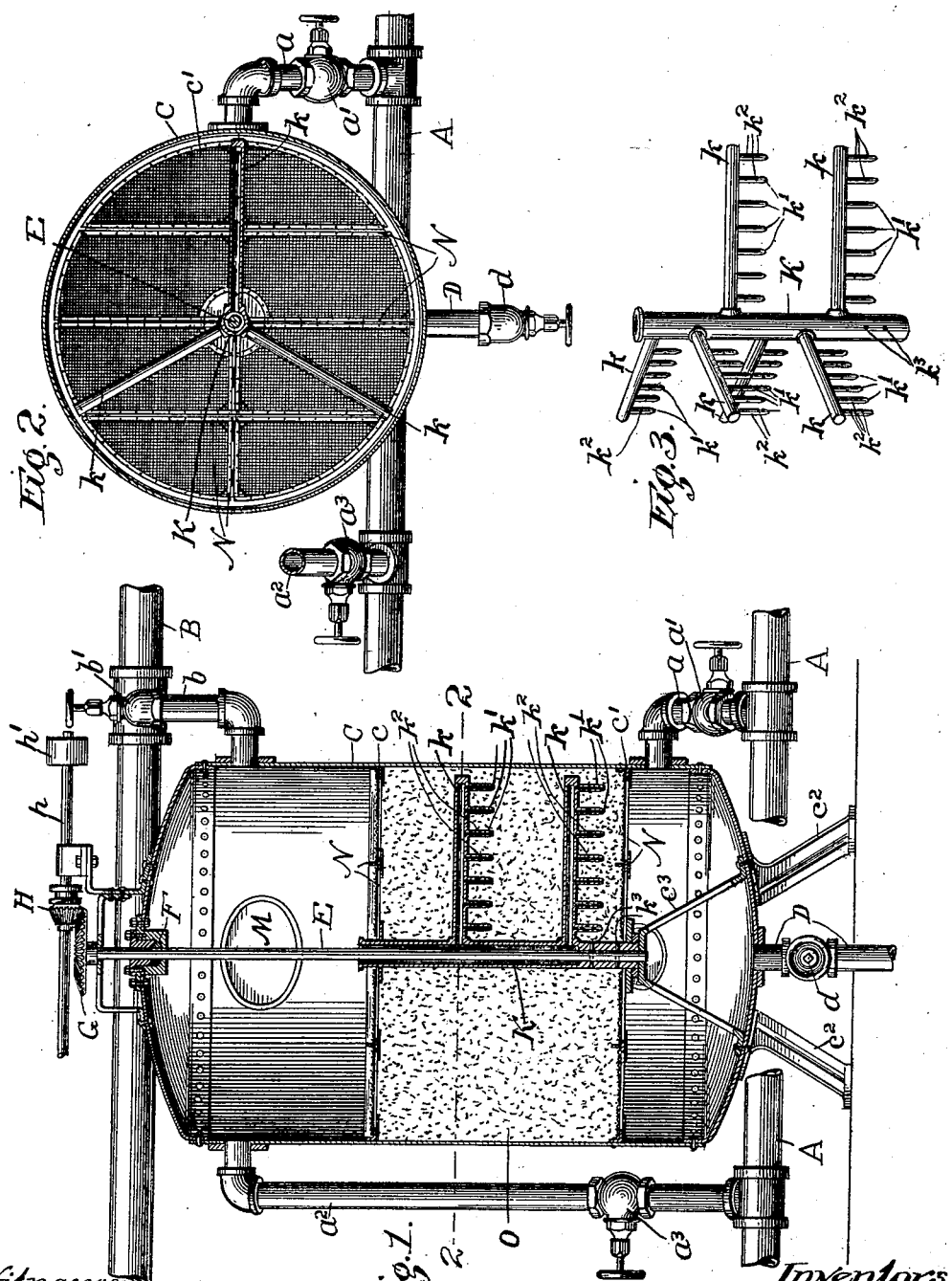

ID: "UNITED STATES PATENT OFFICE."

WILLIAM M. FABER AND ROLAND C. GREER, OF CHICAGO, ILLINOIS.

WATER-FILTER.

SPECIFICATION forming part of Letters Patent No. 666,745, dated January 29, 1901.

Application filed May 18, 1900. Serial No. 17,096. (No model.)

*To all whom it may concern:*

Be it known that we, WILLIAM M. FABER and ROLAND C. GREER, citizens of the United States of America, residing at Chicago, in the county of Cook and State of Illinois, have invented certain new and useful Improvements in Water-Filters, of which the following is a specification.

Our invention relates to certain improvements in water-filters designed especially for the rapid filtration of feed-water for boilers. The main advantage sought is increase of capacity coupled with a perfect separation of the solid particles and greater ease and rapidity of cleaning or washing of the filtering material. Other incidental advantages are attained as the result of the improved devices herein shown and described.

In the drawings, Figure 1 is a vertical diametrical section through a filter embodying our improvements. Fig. 2 is a horizontal section looking downward upon the plane 2 2 of Fig. 1, and Fig. 3 is a detail perspective of certain water-distributing devices designed to assist in the washing of the filtering materials.

Referring to the drawings, A B are feed-water pipes, the pipe A bringing the water to the filter and the pipe B taking the water from the filter to the boiler. The filtering material is contained in a cylindrical reservoir C, containing horizontal partitions $c$ $c'$, preferably of heavy woven wire, between which the material is confined. The supply-pipe A is connected to the portion of the reservoir beneath the filtering material by means of an inlet-pipe $a$, containing a shut-off valve $a'$. Said supply-pipe is connected with the upper portion of the reservoir above the filtering material by means of a washing-out pipe $a^2$, containing a shut-off valve $a^3$. The boiler-pipe B is also connected with the upper portion of the reservoir by means of a discharge-pipe $b$, containing a shut-off valve $b'$. From the bottom of the reservoir extends a discharge-pipe D, containing a shut-off valve $d$. The reservoir is shown as supported upon legs $c^2$, and an inside bracket $c^3$ furnishes a bearing for an upright shaft E, journaled in a stuffing-box F in the top of the reservoir and carrying above the same a bevel-gear G, meshing with a bevel-pinion H upon a shaft $h$, rotated by suitable means, as by the pulley $h'$. To the lower portion of the shaft is secured an open-topped tube K, provided with a series of radial branch pipes $k$, each bearing a series of depending nozzles $k'$, provided with perforations $k^2$. A manhole M provides means of access to the interior, and a series of cross-bars N support the two layers of netting between which the filtering material is confined. Said filtering material is shown at O. The tube K is made fast upon the shaft E by suitable means—as, for instance, pins $k^3$—so that the rotation of the shaft rotates the tube and the radial branches thereof and also carries the depending nozzles $k'$ around through the filtering material, agitating the same and distributing the water evenly therein.

The operation of the filter is as follows: During the ordinary working of the filter the valves $a^3$ $d$ are closed and the valves $a'$ $b'$ open. The water comes through the supply-pipe A into the lower portion of the filter, passes upward through the filtering material O, leaving behind the solid particles held in suspension, and passes out from the upper portion of the filter through the discharge-pipe $b$, from which it passes to the boiler-pipe B and thence to the boiler. When washing out becomes necessary, the valves $b'$ $a'$ are closed and the valves $d$ $a^3$ opened. The water then comes from the supply-pipe A, passes into the upper portion of the filter, thence downward through the filtering material and also through the open-topped pipe K out through the branches of the latter, and is discharged from the depending nozzles, while at the same time the shaft E is rotated, stirring up the filtering material and distributing the water evenly throughout the same by means of the branch pipes and perforated nozzles thereon. The water after it has passed downward through the filtering material escapes through the pipe D, carrying with it the solid particles which have been collected in the filter and thoroughly cleansing the latter.

Many of the details of the construction herein shown are not essential to our invention, broadly considered, and we do not therefore limit ourselves to the specific construction thereof.

We claim as new and desire to secure by Letters Patent—

The combination with a vertical cylindrical reservoir, of reticulated partitions dividing the same into an upper, a middle and a lower portion, a water-supply pipe provided with branches emptying respectively into the upper and lower portions and each containing a shut-off valve, a water-receiving pipe provided with a branch entering the upper portion of the reservoir, containing a shut-off valve, a pipe leading from the bottom of the reservoir and containing a shut-off valve, filtering material in the middle portion of the reservoir, a central vertically-journaled shaft extending downward within the reservoir and provided with means for rotating it therein, an open-topped tube concentric with said shaft and secured thereto, extending from the upper portion of the reservoir downward into the filtering material, laterally-extending branch pipes secured to said open-topped tube and perforated nozzles leading from said branch pipes; substantially as described.

In witness whereof we have hereunto set our hands at Chicago, in the county of Cook and State of Illinois, this 13th day of April, A. D. 1900.

WILLIAM M. FABER.
ROLAND C. GREER.

Witnesses:
CHAS. O. SHERVEY,
S. BLISS.